(12) United States Patent
Murakami et al.

(10) Patent No.: US 11,084,022 B2
(45) Date of Patent: Aug. 10, 2021

(54) PD-SUPPORTING ZR-BASED COMPOSITE OXIDE

(71) Applicants: CATALER CORPORATION, Kakegawa (JP); SANTOKU CORPORATION, Kobe (JP)

(72) Inventors: Kyosuke Murakami, Kakegawa (JP); Keiichi Narita, Kakegawa (JP); Satoshi Matsueda, Kakegawa (JP); Michio Tanaka, Kakegawa (JP); Tadatoshi Murota, Kobe (JP); Shigeru Ono, Kobe (JP); Tomonori Tahara, Kobe (JP)

(73) Assignees: CATALER CORPORATION, Kakegawa (JP); SANTOKU CORPORATION, Kobe (JP)

( * ) Notice: Subject to any disclaimer, the term of this patent is extended or adjusted under 35 U.S.C. 154(b) by 107 days.

(21) Appl. No.: 16/061,493

(22) PCT Filed: Dec. 26, 2016

(86) PCT No.: PCT/JP2016/088772
§ 371 (c)(1),
(2) Date: Jun. 12, 2018

(87) PCT Pub. No.: WO2017/130623
PCT Pub. Date: Aug. 3, 2017

(65) Prior Publication Data
US 2019/0336945 A1 Nov. 7, 2019

(30) Foreign Application Priority Data
Jan. 28, 2016 (JP) .............................. JP2016-014461

(51) Int. Cl.
B01J 23/44 (2006.01)
B01D 53/94 (2006.01)
(Continued)

(52) U.S. Cl.
CPC ............ B01J 23/44 (2013.01); B01D 53/945 (2013.01); B01J 23/10 (2013.01); B01J 37/0018 (2013.01);
(Continued)

(58) Field of Classification Search
CPC ........ B01J 23/44; B01J 23/10; B01J 37/0018; B01J 37/031; B01J 37/04; B01J 37/08; B01D 53/945; F01N 3/101; F01N 3/28
See application file for complete search history.

(56) References Cited

U.S. PATENT DOCUMENTS

| 2004/0043897 | A1* | 3/2004 | Tadao | B01D 53/9422 502/302 |
| 2009/0170689 | A1 | 7/2009 | Hatanaka et al. | |
| 2014/0369912 | A1 | 12/2014 | Zheng et al. | |

FOREIGN PATENT DOCUMENTS

| CN | 100455352 C | 1/2009 |
| JP | 2006-21091 A | 1/2006 |

(Continued)

OTHER PUBLICATIONS

Mar. 7, 2017 Written Opinion issued in PCT/JP2016/088772.
(Continued)

*Primary Examiner* — Sheng H Davis
*Assistant Examiner* — Michael Forrest
(74) *Attorney, Agent, or Firm* — Oliff PLC

(57) ABSTRACT

A Pd-supporting Zr-based composite oxide wherein by having a Zr-containing composite oxide support and Pd supported thereon and by showing, upon XAFS (X-ray absorption fine structure) analysis, a maximum peak in a Pd bond distance range of 2.500-3.500 Å, the maximum peak being located in a position of 3.050-3.110 Å.

14 Claims, 3 Drawing Sheets

(51) Int. Cl.
*B01J 23/10* (2006.01)
*B01J 37/00* (2006.01)
*B01J 37/03* (2006.01)
*B01J 37/04* (2006.01)
*B01J 37/08* (2006.01)
*F01N 3/10* (2006.01)
*F01N 3/28* (2006.01)

(52) U.S. Cl.
CPC ............. *B01J 37/031* (2013.01); *B01J 37/04* (2013.01); *B01J 37/08* (2013.01); *F01N 3/101* (2013.01); *F01N 3/28* (2013.01); *B01D 2255/1023* (2013.01); *B01D 2255/2061* (2013.01); *B01D 2255/2063* (2013.01); *B01D 2255/2065* (2013.01); *B01D 2255/20715* (2013.01); *F01N 2370/02* (2013.01)

(56) References Cited

FOREIGN PATENT DOCUMENTS

| | | |
|---|---|---|
| JP | 2009-78203 A | 4/2009 |
| JP | 2014-223587 A | 12/2014 |
| WO | 2007/107546 A1 | 9/2007 |
| WO | 2007/111004 A1 | 10/2007 |
| WO | 2014/201094 A1 | 12/2014 |
| WO | 2015/083590 A1 | 6/2015 |

OTHER PUBLICATIONS

Mar. 7, 2017 International Search Report issued in PCT/JP2016/088772.
Jun. 26, 2019 Extended European Search Report Issued in European Patent Application No. 16888207.4.

* cited by examiner

PD-SUPPORTING ZR-BASED COMPOSITE OXIDE

FIELD

The present invention relates to a Pd-supporting Zr-based composite oxide. More specifically, it relates to the aforementioned composite oxide that may be suitably used as a component in an exhaust gas purification catalyst for a vehicle.

BACKGROUND

Three-way catalysts having precious metals supported on inorganic oxides are known types of exhaust gas purification catalysts for treatment of vehicle exhaust gas. Such three-way catalysts are widely used as catalysts, as they allow efficient simultaneous removal of hydrocarbons (HC) nitrogen oxide ($NO_x$) and carbon monoxide (CO).

However, exhaust gas purification catalysts, of which three-way catalysts are typical, are known to exhibit reduced activity with the passage of time when they are continuously used under the running conditions of a vehicle. The reduced activity is thought to be due to progressive decrease in catalytic activity by sintering of the precious metals.

In the prior art, therefore, much research has been directed toward discovering means for minimizing sintering degradation of precious metals. Research on low-heat-resistant palladium (Pd) has been particularly avid (PTLs 1 to 3), and such research continues to yield results.

CITATION LIST

Patent Literature

[PTL 1] Japanese Unexamined Patent Publication No. 2006-21091
[PTL 2] Japanese Unexamined Patent Publication No. 2009-78203
[PTL 3] Japanese Unexamined Patent Publication No. 2014-223587

DISCLOSURE OF THE INVENTION

Problems to be Solved by the Invention

Vehicle regulations are moving consistently toward cleaner standards year by year, including increasingly tougher exhaust gas regulations. At the same time, the demand has risen for exhaust gas purification catalysts for vehicles with an even higher level of durability (especially heat resistance) than previously exhibited.

For an exhaust gas purification catalyst, it is important to minimize degradation of precious metals with time in order to ensure catalyst performance after endurance. A prime goal is to minimize degradation of low-heat-resistant Pd.

Furthermore, as demand for increased fuel efficiency spurs further improvements in engines, the trend is toward lower temperatures of gases being introduced into exhaust gas purification catalysts. When precious metals undergo degradation under these conditions, a notable impairment in purification performance results, especially in cold regions. It is therefore extremely important in the field of exhaust gas purification catalysts to minimize degradation of Pd, which exhibits superior catalyst performance in the low-temperature range.

The present invention has been completed in light of the circumstances described above. Its object is to provide a catalyst material for exhaust gas purification that minimizes degradation of Pd with continuous use under vehicle running conditions, and excellent exhaust gas purification performance particularly in the low-temperature range.

Means for Solving the Problems

The present invention provides the following materials in order to achieve the aforementioned object.

[1] A Pd-supporting Zr-based composite oxide,
wherein Pd is supported on a Zr-containing composite oxide support, and
wherein the position of the maximum peak in a Pd bond distance range of 2.500 Å to 3.500 Å, is 3.050 Å to 3.110 Å, as determined by XAFS (X-Ray Absorption Fine Structure) analysis.

[2] The Pd-supporting Zr-based composite oxide according to [1],
wherein the Zr content in terms of $ZrO_2$ is 1 mass % or more and 90 mass % or less,
wherein the Ce content in terms of $CeO_2$ is 90 mass % or less, and
wherein the total of the Zr content in terms of $ZrO_2$ and the Ce content in terms of $CeO_2$ is 80 mass % or more,
the total mass of the composite oxide support being defined as 100 mass %.

[3] The Pd-supporting Zr-based composite oxide according to [1] or [2], wherein the Pd supporting mass in terms of Pd metal is 0.75 mass % or more and 3.0 mass % or less, with respect to the composite oxide support.

[4] An exhaust gas purification catalyst, comprising the Pd-supporting Zr-based composite oxide according to any one of [1] to [3].

Effect of the Invention

According to the invention there is provided a catalyst material for exhaust gas purification that minimizes Pd degradation and has excellent exhaust gas purification performance particularly in the low-temperature range, even with continuous use under harsh conditions such as in vehicle running.

BEST MODE FOR CARRYING OUT THE INVENTION

<Pd-Supporting Zr-Based Composite Oxide>

Figure 1:
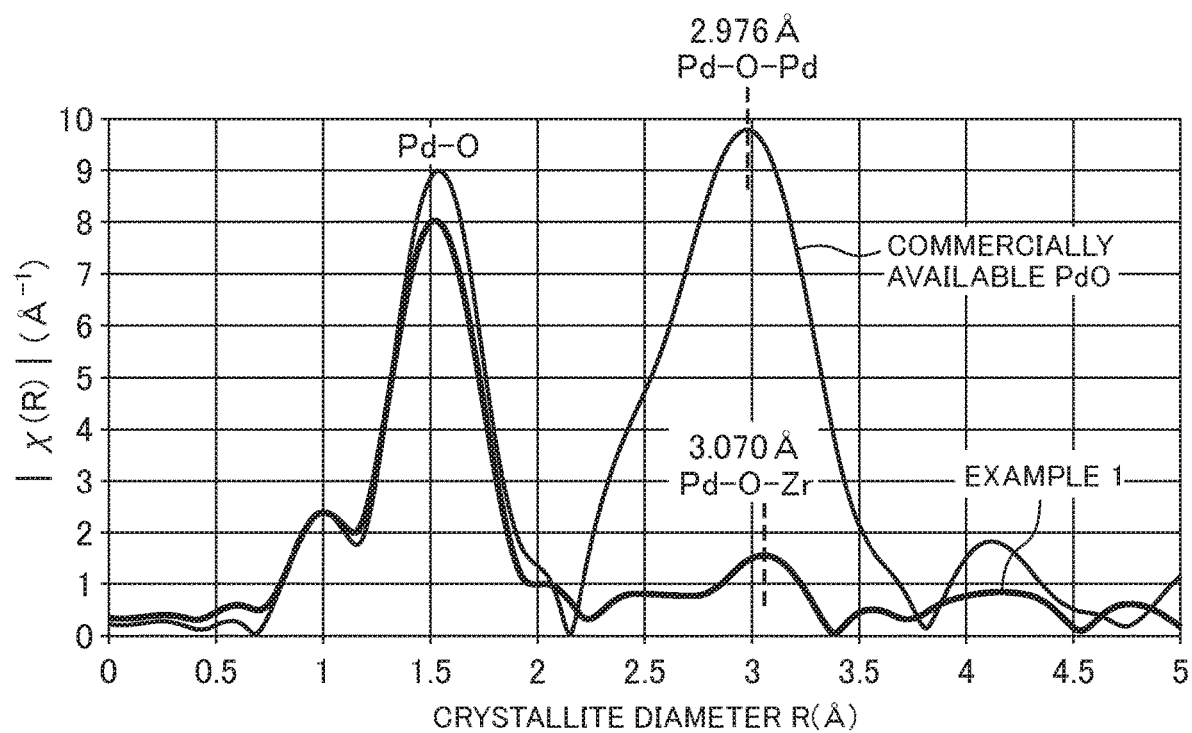
FIG. 1 is a graph showing the XAFS spectrum of the Pd-supporting Zr-based composite oxide obtained in Example 1 in comparison to the spectrum for palladium oxide.

The Pd-supporting Zr-based composite oxide of the invention has Pd supported on a Zr-containing composite oxide support, wherein the position of the maximum peak in a Pd bond distance range of 2.500 Å to 3.500 Å, is 3.050 Å to 3.110 Å, as determined by XAFS (X-Ray Absorption Fine Structure) analysis.

[Zr-Based Composite Oxide Support]

The composite oxide support comprises zirconium (Zr) and preferably comprises cerium (Ce) in addition to Zr, and it may even comprise other metal elements.

Metal elements other than Zr and Ce are preferably rare earth elements (excluding Ce: hereunder, the symbol [Ln] will be used to collectively refer to rare earth elements excluding Ce). Examples of rare earth elements include yttrium (Y), lanthanum (La), praseodymium (Pr), neodymium (Nd), samarium (Sm), europium (Eu), gadolinium (Gd), erbium (Er), ytterbium (Yb) and lutetium (Lu). One or more selected from among Y, La, Pr, Nd and Eu are preferred.

The composite oxide support of the invention is:

preferably composed of a composite oxide comprising Zr and Ce;

more preferably composed of a composite oxide comprising Zr, Ce and a rare earth element other than Ce; and even more preferably composed of a composite oxide comprising Zr, Ce and one or more rare earth elements selected from among Y, La, Pr, Nd and Eu.

The preferred proportion of each metal element in the composite oxide support of the invention may be as follows, in terms of their oxides, with the total mass of the composite oxide support as 100 mass %.

Zr: 1 mass % or more and 90 mass % or less, in terms of $ZrO_2$.

Ce: 90 mass % or less, in terms of $CeO_2$.

Rare earth element other than Ce: 1 mass % or more and 20 mass % or less, in terms of $Ln_2O_3$.

The total of the Zr content in terms of $ZrO_2$ and the Ce content in terms of $CeO_2$ is 80 mass % or more, where 100 mass % is the total mass of the composite oxide support.

If the total mass of the composite oxide support is defined as 100 mass %, the Zr content in terms of $ZrO_2$ is more preferably 2 to 85 mass %, even more preferably 10 to 75 mass % and most preferably 20 to 60 mass %.

If the total mass of the composite oxide support is defined as 100 mass %, the Ce content in terms of $CeO_2$ is more preferably 5 to 80 mass %, even more preferably 15 to 70 mass % and most preferably 25 to 60 mass %.

If the total mass of the composite oxide support is defined as 100 mass %, the content of rare earth elements other than Ce in terms of $Ln_2O_3$ is more preferably 3 to 18 mass %, even more preferably 5 to 15 mass % and most preferably 8 to 12 mass %.

[Pd Supporting Mass]

The content (supporting mass) of Pd in the Pd-supporting Zr-based composite oxide of the invention is preferably 0.75 mass % or more and 3.0 mass % or less, in terms of Pd metal where the mass of the composite oxide support is defined as 100 mass %.

[XAFS Analysis]

When the Pd-supporting Zr-based composite oxide of the invention is subjected to XAFS (X-Ray Absorption Fine Structure) analysis, the position of the maximum peak in a Pd bond distance range of 2.500 Å to 3.500 Å, is seen at 3.050 Å to 3.110 Å, and particularly 3.060 Å to 3.100 Å. This suggests that the second adjacent element to Pd is mainly Zr, and that the Pd—O—Zr bond concentration is high.

When Pd is supported on a Zr-based composite oxide support, it is thought that the Pd metal particles are "riding" on the composite oxide support particles. Such a state is illustrated in the schematic diagram of FIG. 6(a). In the conventional Pd catalyst shown here, the bonding forces between the Pd particles and the support are thought to be electrostatic forces and Van der Waals forces.

Figure 6:
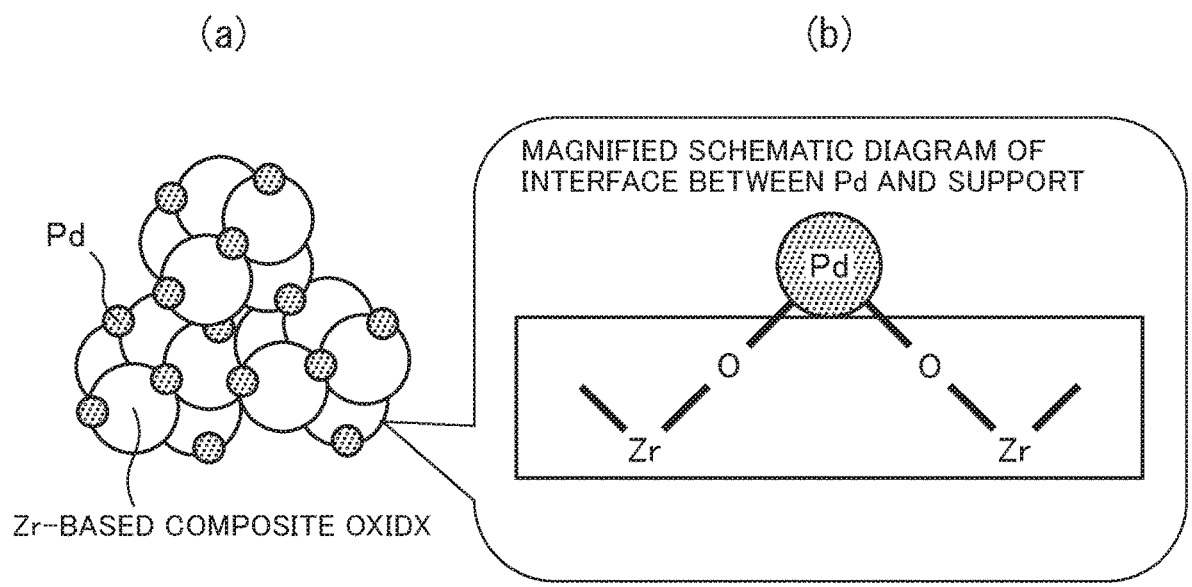
FIG. 6 is a schematic diagram illustrating the structure of a Pd-supporting Zr-based composite oxide.

However, when the Pd particle-support interface of the Pd-supporting Zr-based composite oxide of the invention is microscopically examined, the Pd atoms on the Pd metal particle surfaces and the Zr atoms on the support surface are chemically bond via oxygen atoms O, forming Pd—O—Zr bonds, which can be verified by XAFS analysis. This state is shown as the magnified schematic diagram in FIG. 6(b). FIG. 6(b) depicts two Pd—O—Zr bonds per Pd atom, but the invention is not limited to this mode. The invention also encompasses other forms with 1 or 3 Pd—O—Zr bonds per Pd atom. According to the invention, it is sufficient if the second adjacent element to Pd is Zr.

According to the invention, analysis is focused on the interatomic distance centered on the Pd atoms, as obtained from among the multiple data obtained by XAFS analysis. In XAFS of a composite oxide either containing or supporting Pd, the bond distance between the Pd atom and the oxygen atom, which is the first adjacent element to Pd, usually exhibits a value of approximately 1.5 Å regardless of the type of composite oxide. However, the bond distance between Pd and the second adjacent element is a value characteristic of the type of element M in Pd—O-M (M being the second adjacent element). Consequently, by examining the bond distance of the second adjacent element to Pd and comparing it with documented values, it is possible to identify the type of element M in Pd—O-M.

The following values are examples of known bond distances for second adjacent elements to Pd, as determined by XAFS analysis.

(Bond distances for second adjacent elements to Pd)

Pd—O—Y: 2.880 Å

Pd—O—Pd: 2.976 Å

Pd—O—Zr: 3.068 Å

Pd—O—La: 3.220 Å

Pd—O—Ce: 3.250 Å

Therefore, when the bond distance of the second adjacent element to Pd is near 3.068 Å in XAFS analysis of a Pd-supporting Zr-based composite oxide, it may be assumed that the composite oxide forms Pd—O—Zr bonds. Since the peaks for the second adjacent element to Pd in XAFS analysis usually appear in the range of 2.500 Å to 3.500 Å, the maximum peak in this range is of primary interest for comparison of the bond distances. Taking procedural and analytical errors into account, if the position of the maximum peak with a Pd bond distance in the range of 2.500 Å to 3.500 Å is 3.050 Å to 3.110 Å, as determined by XAFS analysis, the composite oxide may be assumed to have formed Pd—O—Zr bonds.

<Method for Producing Pd-Supporting Zr-Based Composite Oxide>

The Pd-supporting Zr-based composite oxide of the invention may be produced by any method so long as it has the composition and structure described above.

For example, the Pd-supporting Zr-based composite oxide of the invention may be produced by a method comprising the following steps in order:

a first step of heat treating an aqueous solution comprising a zirconium oxide precursor (ZrO precursor) to form a Zr-containing sol (Zr-containing sol-forming step), a second step of adding a palladium precursor (Pd precursor) to the Zr-containing sol obtained in the first step to obtain a Pd-added Zr-containing sol (Pd precursor addition step), a third step of contacting the Pd-added Zr-containing sol obtained in the second step with a basic compound to obtain a precipitate (precipitate-forming step), and a fourth step of firing the precipitate obtained in the third step (firing step).

Each step of this method will now be explained.

[First Step]

The first step is a step of heat treating an aqueous solution comprising a ZrO precursor to form a Zr-containing sol. It is believed that the heat treatment causes the ZrO precursor to be converted to a sol with $Zr(OH)_4$ in a highly dispersed state. It is also believed that in the subsequent second step, addition of the Pd precursor to the highly dispersed Zr compound results in efficient formation of Pd—O—Zr bonds.

The ZrO precursor used here may be, for example, zirconium nitrate, zirconium oxynitrate, zirconium sulfate or zirconium acetate. Zirconium oxynitrate is preferred among these from the viewpoint of allowing highly efficient formation of Pd—O—Zr bonds.

When zirconium hydroxide is used as the ZrO precursor, the Pd—O—Zr bond formation efficiency in the obtained Pd-supporting Zr-based composite oxide is low. Presumably, the presence of the $Zr(OH)_4$ sol, obtained by heat treatment of the aforementioned preferred aqueous ZrO precursor solution, is important for formation of Pd—O—Zr bonds.

The holding temperature during heat treatment in the first step is preferably 90° C. or higher and more preferably 95° C. or higher.

There is no particular restriction on the upper limit of the holding temperature for heat treatment. However, the temperature is preferably no higher than 120° C. and even more preferably no higher than 100° C., since this will eliminate the need for a pressure-resistant container such as an autoclave. For environments in which the use of a pressure-resistant vessel cannot be avoided, there is no prohibition against heat treatment at a higher temperature, such as about 150° C.

The holding time for heat treatment is preferably 5 hours or more and 48 hours or less, and even more preferably 7 hours or more and 24 hours or less. The holding time is the time for which the heat treatment holding temperature is maintained.

For the first step, the heat treated aqueous solution may comprise a rare earth oxide precursor (LnO precursor) in addition to the ZrO precursor. Examples of LnO precursors include rare earth nitrates, sulfates and acetates. Rare earth nitrates are preferred among these from the viewpoint of more easily producing a highly dispersed sol.

The proportion in which each precursor is used should be appropriately determined by a person skilled in the art depending on the desired composition for the Pd-supporting Zr-based composite oxide.

The first step of the invention may be:

carried out in a single stage;

carried out in multiple stages, by dividing the precursor to be added into multiple groups and carrying out addition and heat treatment successively for each group; or carried out by a method of dividing the precursor to be added into multiple groups, carrying out heat treatment for each group, and them mixing them.

The most preferred mode is a method of carrying out the first step by the following two divided stages.

First stage of first step: A stage of preparing an aqueous solution comprising the ZrO precursor and the LnO precursor and heat treating the solution, and:

Second stage of first step: A stage of adding a Ce oxide precursor to the heat treated aqueous solution obtained in the first stage, and heat treating the mixture.

According to the invention, when the first step is carried out in two divided stages, the product of the subsequent second stage is treated as the "Zr-containing sol" to be supplied to the second step. Even if the product of the first stage of the first step is obtained as a sol, the sol is not considered to be the "Zr-containing sol" of the invention if a second-stage is expected to be carried out.

The heat treatment conditions for each stage may be the prepared conditions described above. The heat treatment conditions for the first-stage and the heat treatment conditions for the second-stage may be the same or different conditions.

[Second Step]

The second step is a step of adding a palladium precursor (Pd precursor) to the Zr-containing sol obtained in the first step.

Examples for the Pd precursor to be used here include palladium nitrate and palladium chloride. Palladium nitrate is preferred among these from the viewpoint of allowing highly efficient formation of Pd—O—Zr bonds. The amount of Pd precursor used should be appropriately determined by a person skilled in the art depending on the desired composition for the Pd-supporting Zr-based composite oxide.

For the second step, a rare earth oxide precursor (LnO precursor) other than ceria may also be added, in addition to the Pd precursor. Preferred examples of LnO precursors include rare earth nitrates, with lanthanum nitrate being especially preferred.

[Third step]

The third step is a step of contacting the Pd-added Zr-containing sol obtained in the second step with a basic compound to obtain a precipitate. Examples for the basic compound to be used include ammonia and organic bases. Examples of organic bases include pyridine, triethylamine, diazabicycloundecene and tetraalkylammonium hydroxides. The basic compound to be used in the third step is preferably a tetraalkylammonium hydroxide, and most preferably tetramethylammonium hydroxide.

The basic compound may be used in an excess amount, and for example, a preferred method is one in which the aqueous solution obtained in the second step is loaded into or gradually added to an aqueous solution of the basic compound that has been adjusted to a pH of about 13.0 or more and 14.0 or less.

In the third step, the Pd-added Zr-containing sol obtained in the second step is preferably contacted with a pore-forming agent in combination with the basic compound, from the viewpoint of forming a suitable pore structure in the obtained Pd-supporting Zr-based composite oxide. The pore-forming agent is a compound that is incorporated into the precipitate obtained in the third step, and has a template effect whereby it is burnt off and dissipates in the subsequent firing step, forming pores. Long-chain fatty acids are suitable examples that may be used as pore-forming agents. Specific examples include capric acid, lauric acid, myristic acid and palmitic acid.

The pore-forming agent may be added into the aqueous solution of the basic compound. The amount used may be 16.4 parts by mass or more and 65.4 parts by mass ore less, and preferably 24.5 parts by mass or more and 49.0 parts by mass or less, with respect to 100 parts by mass of the Pd-supporting Zr-based composite oxide, for a favorable resulting pore structure.

[Fourth Step]

In the subsequent fourth step, the precipitate obtained in the third step can be fired to obtain a Pd-supporting Zr-based composite oxide of the invention.

The firing temperature may be 250° C. or higher and 1,200° C. or lower, for example, and is preferably 300° C. or higher and 500° C. or lower. The firing time may be 2 hours or more and 24 hours or less, for example. The ambient atmosphere during firing is preferably an oxidizing atmosphere, and it may be air, for example.

The Pd-supporting Zr-based composite oxide of the invention can be obtained in the following manner.

<Application Example of Pd-Supporting Zr-Based Composite Oxide of the Invention>

The Pd-supporting Zr-based composite oxide of the invention has minimal degradation of Pd even with continuous use under harsh conditions, and exhibits excellent HC purification performance particularly in the low-temperature range. The Pd-supporting Zr-based composite oxide can therefore be suitably used as a component in an exhaust gas purification catalyst for a vehicle, for example.

Below are described non-limitative examples of applying the Pd-supporting Zr-based composite oxide of the invention as a component for a vehicle exhaust gas purification catalyst.

For the embodiments of the invention, the vehicle exhaust gas purification catalysts comprise Pd-supporting Zr-based composite oxides of the invention. Preferably, each composite oxide is coated onto an appropriate base material and used as a catalyst with a monolayer or multilayer structure. At least one of the layers is a coated layer of the Pd-supporting Zr-based composite oxide of the invention.

When the exhaust gas purification catalyst comprising a Pd-supporting Zr-based composite oxide of the invention has a multilayer structure, the layer of the Pd-supporting Zr-based composite oxide of the invention may be any layer of the multilayer catalyst, but preferably it is the lowermost layer that is in direct contact with the base material.

The base material used may be one that is commonly used as a base material in exhaust gas purification catalysts for vehicles. A monolith honeycomb base material may be mentioned as an example.

Examples of other layers may be (composite) oxide catalysts on which a precious metal selected from among Rh, Pt and Pd is supported. The oxide support in this case may be alumina, ceria, zirconia or cerium-zirconium composite oxide, for example. The other layers may be formed on the base material by a publicly known method.

A vehicle exhaust gas purification catalyst having such a structure can efficiently remove HC, $NO_x$ and CO simultaneously under low temperature conditions, while having very low sintering degradation of the Pd particles even with continuous use under harsh conditions, and therefore exhibiting a long usable life.

EXAMPLES

<Catalyst Preparation>

Example 1

(1) Zr-Containing Sol-Forming Step i) First Stage

A Zr—Y aqueous solution was prepared by mixing:

75 g of an aqueous zirconium oxynitrate solution with a concentration of 20 mass % in terms of $ZrO_2$, 5 mL of an aqueous yttrium nitrate solution with a concentration of 300 g/L in terms of $Y_2O_3$, 7.5 mL of nitric acid with a concentration of 67.5 mass % in terms of $HNO_3$ and a specific gravity of 1.4, and 1,000 mL of purified water. The total amount of the aqueous Zr—Y solution was poured into a container equipped with a condenser tube and a stirrer, and after holding to heat while stirring at 98° C. for 8 hours, it was cooled to room temperature.

ii) Second Stage

To the cooled aqueous Zr—Y solution there was added 60 mL of an aqueous cerium nitrate solution with a concentration of 200 g/L in terms of $CeO_2$, wherein 95 mol % of the Ce ion was tetravalent, to prepare an aqueous Zr—Y—Ce solution. The total amount of the aqueous Zr—Y—Ce solution was poured into a container equipped with a condenser tube and a stirrer, and after holding to heat while stirring at 98° C. for 20 hours to form a Zr-containing sol, it was cooled to room temperature.

(2) Pd Precursor Addition Step

To the cooled Zr-containing sol there were added:

5 mL of an aqueous lanthanum nitrate solution with a concentration of 300 g/L in terms of $La_2O_3$, and 1,000 mL of purified water, and after stirring with a stirrer, 11.31 g of an aqueous palladium nitrate solution with a concentration in terms of Pd metal of 8.2 mass % was added, to prepare a Pd-added Zr-containing sol.

(3) Precipitate-Forming Step

After mixing 10.1 g of lauric acid and 760 mL of an aqueous solution of tetramethylammonium hydroxide (TMAH) at a concentration of 128 g/L, the mixture was stirred until the becoming transparent, to prepare a TMAH solution of lauric acid.

To the TMAH solution of lauric acid there was added the Pd-added Zr-containing sol obtained above in "(2) Pd precursor addition step", using a metering pump at a rate of 50 mL/min while stirring, to obtain a slurry containing a precipitate.

(4) Firing Step

The precipitate in the slurry was filtered using a Nutsche filter. The obtained precipitate was rinsed with 1,000 mL of purified water and fired for 5 hours in air at 400° C., after which it was ground with a mortar to obtain a Pd-supporting Zr-based composite oxide.

Example 2

A Pd-supporting Zr-based composite oxide was obtained by the same procedure as Example 1, except that after addition of the aqueous zirconium oxynitrate solution in the heating and holding step of the first stage of (1) in Example 1 above, there was further added 3.0 mL of an aqueous cerium nitrate solution with a concentration of 200 g/L in terms of $CeO_2$, with 95 mol % of the Ce ions being tetravalent, and in the heating and holding step of the second stage of (2), the amount of aqueous cerium nitrate solution used was 57 mL.

Example 3

A Pd-supporting Zr-based composite oxide was obtained by the same procedure as Example 1, except that the amount of aqueous zirconium oxynitrate solution used in the heating and holding step of the first stage of (1) in Example 1 above was 67.5 g, and after addition of the aqueous cerium nitrate solution in the heating and holding step of the second stage of (2), 7.5 g of an aqueous zirconium oxynitrate solution with the same concentration as above was added.

Examples 4 to 9 and Comparative Example 7

Pd-supporting Zr-based composite oxides were each obtained by the same procedure as Example 1, except that the amounts of the solutions used in each of the steps were as shown in Table 1.

For Example 8, no cerium nitrate solution was added in "(1) Zr-containing sol-forming step, ii) Second stage". In Example 8, after heating and holding at 98° C. for 8 hours in i) First stage, and then cooling to room temperature, heating and holding was carried out at 98° C. for 20 hours while stirring in ii) Second stage without addition of a cerium nitrate solution.

Comparative Example 1

A Pd-supporting Zr-based composite oxide was obtained by immersing 30 g of a Zr-based composite oxide (commercial product) with a composition of Zr:Ce:La:Y=50:40:5:5 in terms of oxides, in 11.31 g of an aqueous palladium nitrate solution with a concentration in terms of Pd metal of 8.2 mass %, for 1 hour at 25° C., drying it at 100° C. for 24 hours, and then firing at 400° C. for 5 hours.

Comparative Examples 2 to 6, 8 and 9

Pd-supporting Zr-based composite oxides were obtained by the same procedure as Comparative Example 1, except that the compositions of the Zr-based composite oxides (commercial products) used and the Pd supporting masses were changed as shown in Table 3.

TABLE 1

Catalyst preparation

Amount of solution used

| | First step (Zr-containing sol-forming step) | | | Second step (Pd precursor addition step) |
|---|---|---|---|---|
| | First stage | | Second stage Type Solution used | |
| | Aqueous Zr oxynitrate solution | Aqueous Y nitrate solution | Ce nitrate Concentration | Aqueous La nitrate solution | Aqueous Pd nitrate solution |
| | 20 wt % (as $ZrO_2$) | 300 g/L (as $Y_2O_3$) | 200 g/L (as $CeO_2$) | 300 g/L (as $La_2O_3$) | 8.2 wt % (as Pd) |
| Example 4 | 105 g | 5 mL | 30 mL | 5 mL | 11.31 g |
| Example 5 | 120 g | 5 mL | 15 mL | 5 mL | 11.31 g |
| Example 6 | 55.5 g | 5 mL | 79.5 mL | 5 mL | 11.31 g |
| Example 7 | 3 g | 5 mL | 132 mL | 5 mL | 11.31 g |
| Example 8 | 135 g | 5 mL | 0 | 5 mL | 11.31 g |
| Example 9 | 75 g | 5 mL | 60 mL | 5 mL | 2.83 g |
| Comp. Example 7 | 0 | 5 mL | 135 mL | 5 mL | 11.31 g |

Table 2 shows the metal element amounts in terms of oxides in the support precursors used in each solution in each step for preparation of the catalysts, and the Pd element amounts in terms of metal, in the Pd precursors.

TABLE 2

Pd-supporting Zr-based composite oxide composition: Amounts added in each step in terms of precursor

| | First step (Zr-containing sol-forming step) | | | | Second step (Pd precursor addition step) | |
|---|---|---|---|---|---|---|
| | First stage | | Second stage | | | |
| | Oxide wt % | | Oxide wt % | | Oxide wt % | Metal wt % |
| | Zr | Ce | Y | Ce | Zr | La | Pd |
| Example 1 | 50 | 0 | 5 | 40 | 0 | 5 | 3.00 |
| Example 2 | 50 | 2 | 5 | 38 | 0 | 5 | 3.00 |
| Example 3 | 45 | 0 | 5 | 40 | 5 | 5 | 3.00 |
| Example 4 | 70 | 0 | 5 | 20 | 0 | 5 | 3.00 |
| Example 5 | 80 | 0 | 5 | 10 | 0 | 5 | 3.00 |

TABLE 2-continued

Pd-supporting Zr-based composite oxide composition: Amounts added in each step in terms of precursor

| | First step (Zr-containing sol-forming step) | | | | | Second step (Pd precursor addition step) | |
|---|---|---|---|---|---|---|---|
| | First stage | | | Second stage | | | |
| | Oxide wt % | | | Oxide wt % | | Oxide wt % | Metal wt % |
| | Zr | Ce | Y | Ce | Zr | La | Pd |
| Example 6 | 37 | 0 | 5 | 53 | 0 | 5 | 3.00 |
| Example 7 | 2 | 0 | 5 | 88 | 0 | 5 | 3.00 |
| Example 8 | 90 | 0 | 5 | 0 | 0 | 5 | 3.00 |
| Example 9 | 50 | 0 | 5 | 40 | 0 | 5 | 0.75 |
| Comp. Example 7 | 0 | 0 | 5 | 90 | 0 | 5 | 3.00 |

<Catalyst Evaluation>

The Pd-supporting Zr-based composite oxides obtained in the Examples and Comparative Examples were subjected to X-Ray Absorption Fine Structure (XAFS) and X-ray diffraction (XRD) by the following methods.

[XAFS]

A sample of each Zr-based composite oxide was analyzed by XAFS under the following conditions, using commercially available palladium oxide (PdO) as the reference.
Ring: Spring-8 BL14-B2 Large synchrotron radiation facility
Apparatus: XAFS apparatus
Method: Transmission method
Measuring atmosphere: Air
Measuring temperature: 20° C.
Absorption edge: near PdK absorption edge (25.3 keV)
Curve fitting program: FEFF The bond distance of the second adjacent element to Pd was calculated from the Fourier-transformed XAFS spectrum obtained for each sample and compared with the values mentioned above, for element identification.

Figure 2:
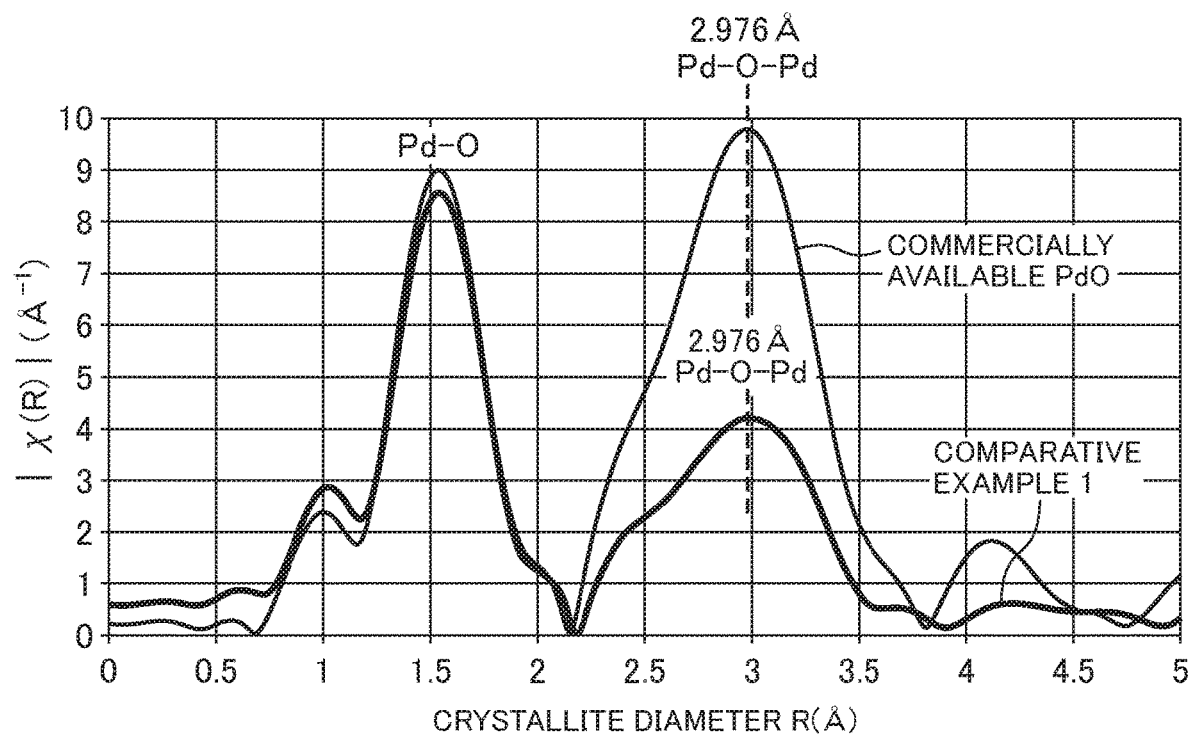
FIG. 2 is a graph showing the XAFS spectrum of the Pd-supporting Zr-based composite oxide obtained in Comparative Example 1 in comparison to the spectrum for palladium oxide.

The bond distances of the second adjacent elements to Pd obtained for each sample and the identified second adjacent elements are shown in Table 3. Also, XAFS spectra obtained using the Zr-based composite oxide obtained in Example 1 and Comparative Example 1 as samples are shown in FIGS. 1 and 2, together with the spectrum for commercially available PdO.

[XRD]

XRD measurement was conducted with each Zr-based composite oxide as the sample, after 10 hours of endurance at 1,000° C. while alternatingly switching between circulations of 10 mass % $O_2/N_2$ and 5 mass % $CO/N_2$ at a flow rate of 10 L/min. A model "RINT-2500" by Rigaku Corp. was used for the measurement.

The Pd crystallite diameter was calculated from the obtained XRD profile. The results are shown in Table 3.

TABLE 3

Pd-supporting Zr composite oxide compositions and evaluation results

| | Pd-supporting Zr composite oxide composition | | | | | | Evaluation results | | |
|---|---|---|---|---|---|---|---|---|---|
| | | Support | | | | | XAFS | | XRD |
| | | Composition oxide wt % | | | | | Bond distance | | Pd |
| | Pd metal wt % | Zr | Ce | La | Y | Source | for second adjacent element to Pd (Å) | Second adjacent element to Pd | crystallite diameter (nm) |
| Example 1 | 3.00 | 50 | 40 | 5 | 5 | Synthetic | 3.070 | Pd—O—Zr | 50.8 |
| Example 2 | 3.00 | 50 | 40 | 5 | 5 | Synthetic | 3.088 | Pd—O—Zr | 49.4 |
| Example 3 | 3.00 | 50 | 40 | 5 | 5 | Synthetic | 3.099 | Pd—O—Zr | 43.3 |
| Example 4 | 3.00 | 70 | 20 | 5 | 5 | Synthetic | 3.068 | Pd—O—Zr | 43.9 |
| Example 5 | 3.00 | 80 | 10 | 5 | 5 | Synthetic | 3.068 | Pd—O—Zr | 48.5 |
| Example 6 | 3.00 | 37 | 53 | 5 | 5 | Synthetic | 3.068 | Pd—O—Zr | 54.2 |
| Example 7 | 3.00 | 2 | 88 | 5 | 5 | Synthetic | 3.068 | Pd—O—Zr | 44.0 |
| Example 8 | 3.00 | 90 | 0 | 5 | 5 | Synthetic | 3.068 | Pd—O—Zr | 56.2 |
| Example 9 | 0.75 | 50 | 40 | 5 | 5 | Synthetic | 3.068 | Pd—O—Zr | 53.5 |
| Comp. Example 1 | 3.00 | 50 | 40 | 5 | 5 | Commercial product | 2.976 | Pd—O—Pd | 65.0 |
| Comp. Example 2 | 3.00 | 70 | 20 | 5 | 5 | Commercial product | 2.976 | Pd—O—Pd | 54.0 |
| Comp. Example 3 | 3.00 | 80 | 10 | 5 | 5 | Commercial product | 2.976 | Pd—O—Pd | 60.1 |
| Comp. Example 4 | 3.00 | 37 | 53 | 5 | 5 | Commercial product | 2.976 | Pd—O—Pd | 65.0 |
| Comp. Example 5 | 3.00 | 2 | 88 | 5 | 5 | Commercial product | 2.976 | Pd—O—Pd | 59.9 |
| Comp. Example 6 | 3.00 | 90 | 0 | 5 | 5 | Commercial product | 2.976 | Pd—O—Pd | 79.3 |
| Comp. Example 7 | 3.00 | 0 | 90 | 5 | 5 | Synthetic | 2.976 | Pd—O—Pd | 69.0 |
| Comp. Example 8 | 3.00 | 0 | 90 | 5 | 5 | Commercial product | 2.976 | Pd—O—Pd | 70.0 |
| Comp. Example 9 | 0.75 | 50 | 40 | 5 | 5 | Commercial product | 2.976 | Pd—O—Pd | 62.4 |

The results of XAFS confirmed that the second adjacent element to Pd was different in the working samples of the invention (examples) and the prior art samples (comparative examples). Only Pd—O—Pd was detected in the oxides of the comparative examples, while Pd—O—Zr was detected in the examples. This suggests that the Pd-supporting Zr-based composite oxides of the invention had stronger interaction between the Pd and support, compared to the prior art samples.

In addition, the results of XRD demonstrated that the Pd-supporting Zr-based composite oxides of the invention had smaller Pd crystallite diameters after endurance, compared to the prior art samples. This is attributed to reduced degradation of Pd after endurance, due to formation of Pd—O—Zr bonds.

Figure 3:
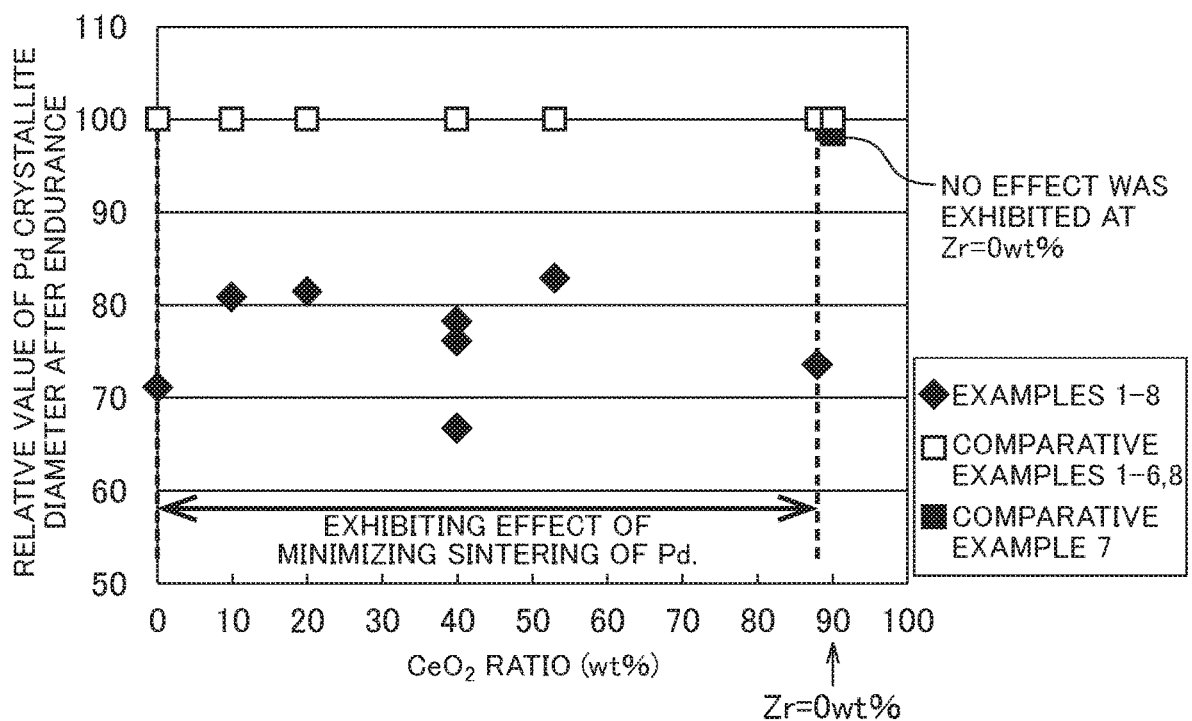
FIG. 3 is a graph showing the Pd crystallite diameters of the Pd-supporting Zr-based composite oxides obtained in each of the examples, as relative values with respect to the Pd crystallite diameters of comparative examples with the same composition.

FIG. 3 is a graph showing the Pd crystallite diameters of the Pd-supporting Zr-based composite oxides obtained in each of the examples, as relative values with respect to the Pd crystallite diameters of comparative examples with the same composition. It was confirmed that the invention exhibits an effect of minimizing sintering of Pd. No such effect was exhibited in Comparative Example 7, where the Zr content was zero. This phenomenon is believed to be due to the lack of formation of Pd—O—Zr bonds.

<Catalyst Performance Evaluation>
[Preparation of Two-Layer Catalysts]

Example 10

A slurry for formation of a lower layer was prepared by mixing 200 g of alumina, 200 g of the Pd-supporting Zr-based composite oxide obtained in Example 1, 50 g of barium sulfate and 2,000 g of water. The slurry for formation of the lower layer was coated onto a monolith honeycomb base material having a volume of 1 L, dried at 250° C., and then fired at 500° C. for 1 hour.

An aqueous rhodium nitrate solution in an amount corresponding to 0.5 g in terms of Rh metal was mixed with 200 g of alumina, 200 g of zirconium oxide, 50 g of barium sulfate and 2,000 g of water, to prepare a slurry for formation of an upper layer. The slurry for formation of the upper layer was further coated onto the monolith honeycomb base material after the slurry for formation of the lower layer was coated, dried and fired, and then dried at 250° C., and fired at 500° C. for 1 hour to prepare a two-layer catalyst coated on a monolith honeycomb base material.

Comparative Example 10

A two-layer catalyst coated on a monolith honeycomb base material was prepared in the same manner as Example 10, except that the Pd-supporting Zr-based composite oxide obtained in Comparative Example 1 was used in the same amount, instead of the Pd-supporting Zr-based composite oxide obtained in Example 1.

[Evaluation in Actual Vehicle]

The catalysts obtained in Example 10 and Comparative Example 10 were evaluated in actual vehicles, by the following method.

First, an engine for catalyst endurance with a 4.0 L cylinder capacity was used for steady-state endurance for 50 hours. The catalyst after endurance was then installed in a vehicle with a cylinder capacity of 1.0 L, and the cold HC emission was measured in JC08 mode. The measurement results are shown in FIG. 4 and FIG. 5.

Figure 4:
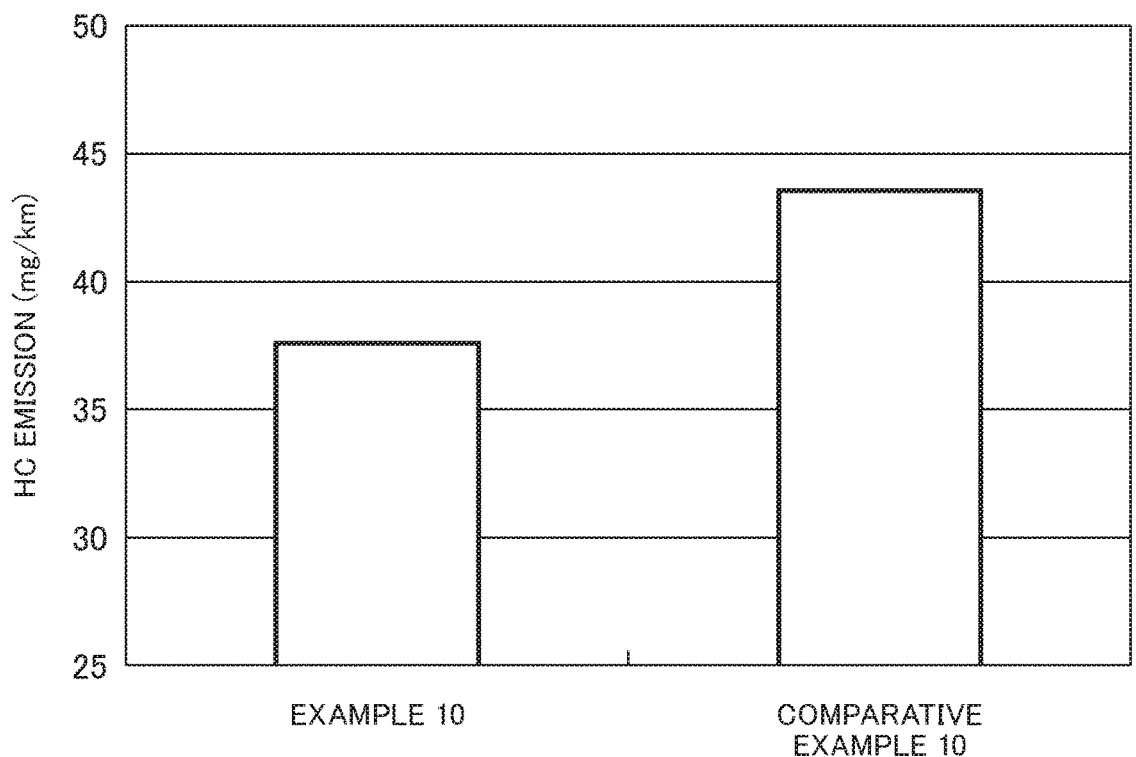
FIG. 4 is a graph showing a comparison of cold HC emissions of the two-layer catalysts obtained in Example 10 and Comparative Example 10.
Figure 5:
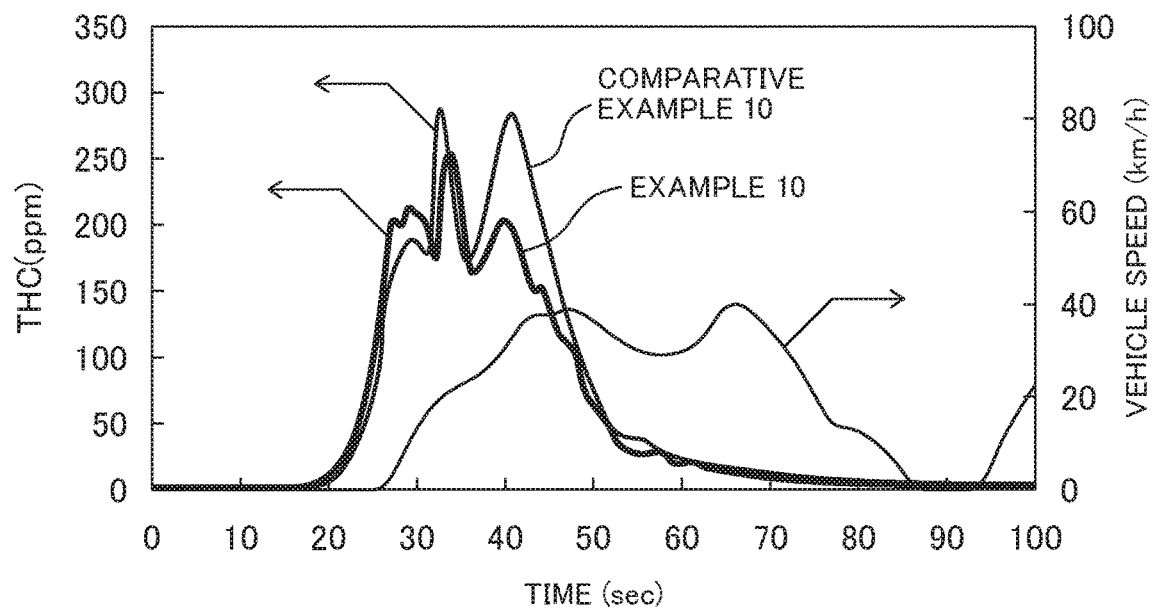
FIG. 5 is a graph showing a comparison of the cold HC emission behaviors of the two-layer catalysts obtained in Example 10 and Comparative Example 10.

Referring to FIG. 4 and FIG. 5, it is seen that the catalyst of Example 10 had satisfactory catalyst performance after endurance compared to the catalyst of Comparative Example 10 (prior art product model). This phenomenon is attributed to reduced degradation of Pd due to formation of Pd—O—Zr bonds.

The invention claimed is:

1. A Pd-supporting Zr-based composite oxide,
   wherein Pd is supported on a Zr-containing composite oxide support, and
   wherein the location of the maximum peak in a Pd bond distance range of 2.500 Å to 3.500 Å, is 3.050 Å to 3.110 Å, as determined by XAFS (X-Ray Absorption Fine Structure) analysis.

2. The Pd-supporting Zr-based composite oxide according to claim 1,
   wherein the location of the maximum peak in a Pd bond distance range of 2.500 Å to 3.500 Å, is 3.060 Å to 3.100 Å, as determined by XAFS analysis.

3. The Pd-supporting Zr-based composite oxide according to claim 1,
   wherein the Zr content in terms of $ZrO_2$ is 1 mass % or more and 90 mass % or less,
   wherein the Ce content in terms of $CeO_2$ is 90 mass % or less, and
   wherein the total of the Zr content in terms of $ZrO_2$ and the Ce content in terms of $CeO_2$ is 80 mass % or more,
   the total mass of the exhaust gas purification catalyst being defined as 100 mass %.

4. The Pd-supporting Zr-based composite oxide according to claim 3,
   wherein the Zr content in terms of $ZrO_2$ is 2 mass % or more and 85 mass % or less,
   the total mass of the exhaust gas purification catalyst being defined as 100 mass %.

5. The Pd-supporting Zr-based composite oxide according to claim 3,
   wherein the Ce content in terms of $CeO_2$ is 5 mass % or more and 80 mass % or less,
   the total mass of the exhaust gas purification catalyst being defined as 100 mass %.

6. The Pd-supporting Zr-based composite oxide according to claim 1,
   wherein the composite oxide support comprises a rare earth element (Ln) excluding Ce.

7. The Pd-supporting Zr-based composite oxide according to claim 6,
   wherein the rare earth element (Ln) excluding Ce is one or more rare earth elements selected from among Y, La, Pr, Nd and Eu.

8. The Pd-supporting Zr-based composite oxide according to claim 6,
   wherein the content of rare earth element (Ln) excluding Ce in terms of $Ln_2O_3$ is 1 mass % or more and 20 mass % or less,
   the total mass of the composite oxide support being defined as 100 mass %.

9. The Pd-supporting Zr-based composite oxide according to claim 1 wherein the Pd supporting mass in terms of Pd metal is 0.75 mass % or more and 3.0 mass % or less, with respect to the exhaust gas purification catalyst.

10. An exhaust gas purification catalyst, comprising the Pd-supporting Zr-based composite oxide according to claim 1.

11. The exhaust gas purification catalyst according claim 10,
    wherein the exhaust gas purification catalyst has a monolayer or multilayer structure onto a base material, and at least one of the layers is a coated layer of the Pd-supporting Zr-based composite oxide.

12. A method for producing the Pd-supporting Zr-based composite oxide according to claim 1,
wherein the method comprises the following steps in order:
a first step of heat treating an aqueous solution comprising a zirconium oxide precursor to form a Zr-containing sol,
a second step of adding a palladium precursor to the Zr-containing sol obtained in the first step to obtain a Pd-added Zr-containing sol,
a third step of contacting the Pd-added Zr-containing sol obtained in the second step with a basic compound to obtain a precipitate, and
a fourth step of firing the precipitate obtained in the third step.

13. The method according to claim 12,
wherein the zirconium oxide precursor is selected from zirconium nitrate, zirconium oxynitrate, zirconium sulfate and zirconium acetate.

14. The method according to claim 12,
wherein the Pd-added Zr-containing sol is contacted with a pore-forming agent which is a long-chain fatty acid, in combination with the basic compound to obtain a precipitate, in the third step.

* * * * *